United States Patent
Lin et al.

(10) Patent No.: US 6,222,957 B1
(45) Date of Patent: Apr. 24, 2001

(54) DISPERSION SLOPE COMPENSATOR

(75) Inventors: Samuel I-En Lin, Chu-Nan Town; Win-Yann Jang, Taichung; Jeng-Cherng Dung, HsinChu; Sien Chi, Chun-Kung first Rd, all of (TW)

(73) Assignee: Uconn Technology Inc. (TW)

( * ) Notice: Subject to any disclaimer, the term of this patent is extended or adjusted under 35 U.S.C. 154(b) by 0 days.

(21) Appl. No.: 09/293,868

(22) Filed: Apr. 19, 1999

(30) Foreign Application Priority Data

Dec. 10, 1998 (KR) .................................................. 87120557

(51) Int. Cl.[7] ...................................................... G02B 6/28
(52) U.S. Cl. .................................. 385/24; 385/37; 385/46
(58) Field of Search ................................ 385/24, 37, 11, 385/46, 27, 123; 359/124, 130, 134, 135, 173, 179; 372/6, 20

(56) References Cited

U.S. PATENT DOCUMENTS 5,748,349 * 5/1998 Mizrahi .............................. 385/37 X
6,097,861 * 8/2000 Kim et al. ........................... 385/24 X

* cited by examiner

Primary Examiner—Phan T. H. Palmer
(74) Attorney, Agent, or Firm—Michael D. Bednarek; Shaw Pittman

(57) ABSTRACT

A dispersion slope compensator includes a dispersion compensation fiber, an optical circulator and a plurality of fiber gratings. The optical circulator is connected between an optical fiber and the dispersion compensation fiber for introducing mixed optical signals propagating in the optical fiber into the dispersion compensation fiber. The fiber gratings are provided at predetermined positions of the dispersion compensation fiber so as to respectively reflect the mixed optical signals back to the optical fiber through the optical circulator. Thus, accumulated dispersions of the mixed optical signals are fully compensated due to different propagating distances of each of the mixed optical signals in the dispersion compensation fiber.

3 Claims, 4 Drawing Sheets

DISPERSION SLOPE COMPENSATOR

BACKGROUND OF THE INVENTION

1. Field of the Invention

The present invention relates in general to an inexpensive dispersion slope compensator able to equalize the energies of output optical signals.

2. Description of the Related Art

The development and use of optical fibers has greatly increased the ability of people around the world to communicate. Due to the swelling requirements of wide bandwidth, current trends in the designs of the optical fiber networks tend towards increasing volume, reliability and economy. With such requirements, a wavelength division multiplexing (WDM) transmission system is the best choice.

It has been noticed that too large a dispersion or a long-distance signal transmission easily causes signal interference in any a wave band. Furthermore, the extent of accumulated dispersions for each optical signal in a WDM transmission system is always different, so using a single dispersion compensation fiber to simultaneously compensate the accumulated dispersions for all the optical signals perfectly is impossible. Thus, various techniques of controlling the compensation for dispersion are being actively developed.

FIG. 1 depicts a dispersion slope compensator according to a first example of the prior art, wherein mixed optical signals of wavelengths $\lambda_1$, $\lambda_2$ propagating in an optical fiber 11 are transmitted to optical filters 15, 16 through a fiber coupler 12. The optical filters 15, 16 are used to select the optical signals. For example, the optical filter 15 only allows the optical signal of wavelength $\lambda_1$ to propagate into a dispersion compensation fiber 17, while the other optical filter 16 only allows the optical signal of wavelength $\lambda_2$ to propagate into another dispersion compensation fiber 18. The two dispersion compensation fibers 17, 18 are of different lengths so that the respective dispersions of the optical signals of wavelengths $\lambda_1$ and $\lambda_2$ are compensated perfectly. Then, the two compensated optical signals of wavelengths $\lambda_1$ and $\lambda_2$ are combined by another fiber coupler 19.

In the first example, three optical filters and dispersion compensation fibers will be used if three optical signals of different wavelengths $\lambda_1$, $\lambda_2$ and $\lambda_3$ are mixed and simultaneously transmitted. By analogy, N optical filters and dispersion compensation fibers are used when N optical signals of different wavelengths $\lambda_1$, $\lambda_2$ ... $\lambda_N$ are mixed and simultaneously transmitted.

FIG. 2 depicts another dispersion slope compensator according to a second example of the prior art, which includes two arrayed waveguide gratings (AWGs) 21, 22 and a plurality of dispersion compensation fibers 23 connected therebetween. An optical fiber for propagating mixed optical signals of wavelengths $\lambda_1$, $\lambda_2$ ... $\lambda_N$ is connected to one of the inputs 1, 2, ... , N of the arrayed waveguide grating 21. The arrayed waveguide grating 21 separates the mixed optical signals into the dispersion compensation fibers 23. The dispersion compensation fibers 23 are of different lengths so that the respective dispersions of the optical signals of wavelengths $\lambda_1$, $\lambda_2$ ... $\lambda_N$ are compensated perfectly. Then, the compensated optical signals are combined by the other arrayed waveguide grating 22 and sent out from one of the outputs 1', 2', ... , N' of the arrayed waveguide grating 22.

The disadvantages of the first and second examples mentioned above are now discussed. In the first example, the use of optical filters 15, 16 results in a great deal of energy loss. The more channels used, the more energy of the transmitted optical signals lost. The energy loss of the transmitted optical signals would be 6 dB for two channels and 9 dB for three channels.

Furthermore, both of the two examples mentioned above fail to equalize the energy of each channel. To solve this problem, erbium-doped fiber amplifiers (EDFAs) generally are provided after the dispersion compensation fibers for equalizing the strengths of each optical signals. However, EDFAs are very expensive, the use of which greatly increases the cost of building the WDM transmission system.

SUMMARY OF THE INVENTION

An object of the present invention is to provide a dispersion slope compensator that solves the above-mentioned problems.

In accordance with the object of the present invention, a dispersion slope compensator is provided. The dispersion slope compensator includes a dispersion compensation fiber, an optical circulator and a plurality of fiber gratings. The optical circulator is connected between an optical fiber and the dispersion compensation fiber for introducing mixed optical signals propagating in the optical fiber into the dispersion compensation fiber. The fiber gratings are provided at predetermined positions of the dispersion compensation fiber so as to respectively reflect the mixed optical signals back to the optical fiber through the optical circulator. Thus, accumulated dispersions of the mixed optical signals are fully compensated due to different propagating distances of each of the mixed optical signals in the dispersion compensation fiber.

Furthermore, the reflectivity of each fiber gratings in the present invention is predetermined by controlling the time period for exposing the germanium doped silicon fiber to ultraviolet rays in the manufacturing process. The optical signal propagating a long distance in the dispersion compensation fiber corresponds to the fiber gratings of high reflectivity. On the other hand, the optical signal propagating a short distance in the dispersion compensation fiber corresponds to the fiber grating of low reflectivity. In this way, the energies of respective optical signals are made equal to each other.

Furthermore, the optical circulator, the dispersion compensation fiber and the fiber gratings used in the present invention are all commercially available and inexpensive. Therefore, the cost of building the WDM transmission system can be greatly reduced.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
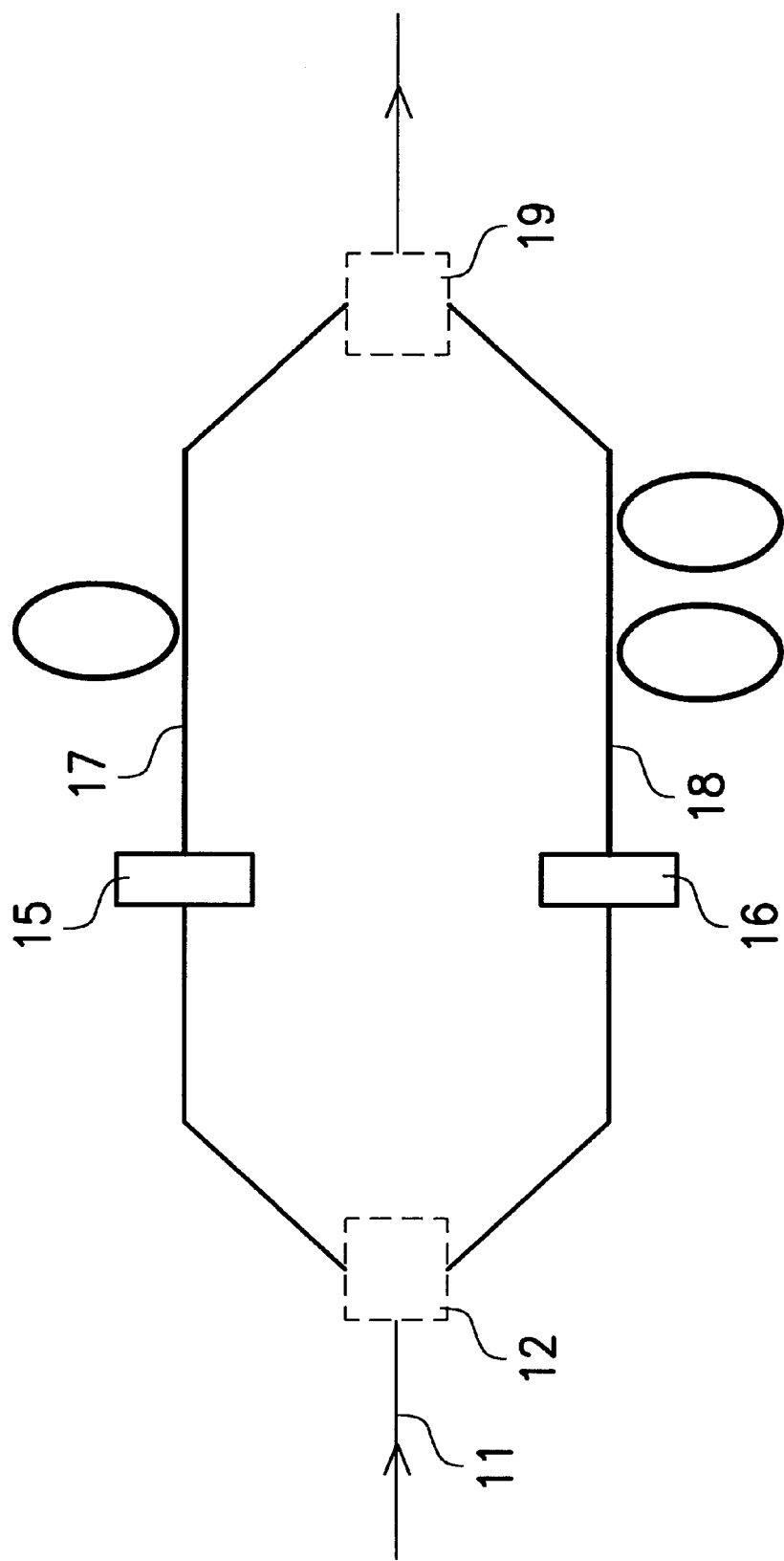
FIG. 1 depicts a dispersion slope compensator according to a first example of the prior art.
Figure 2:
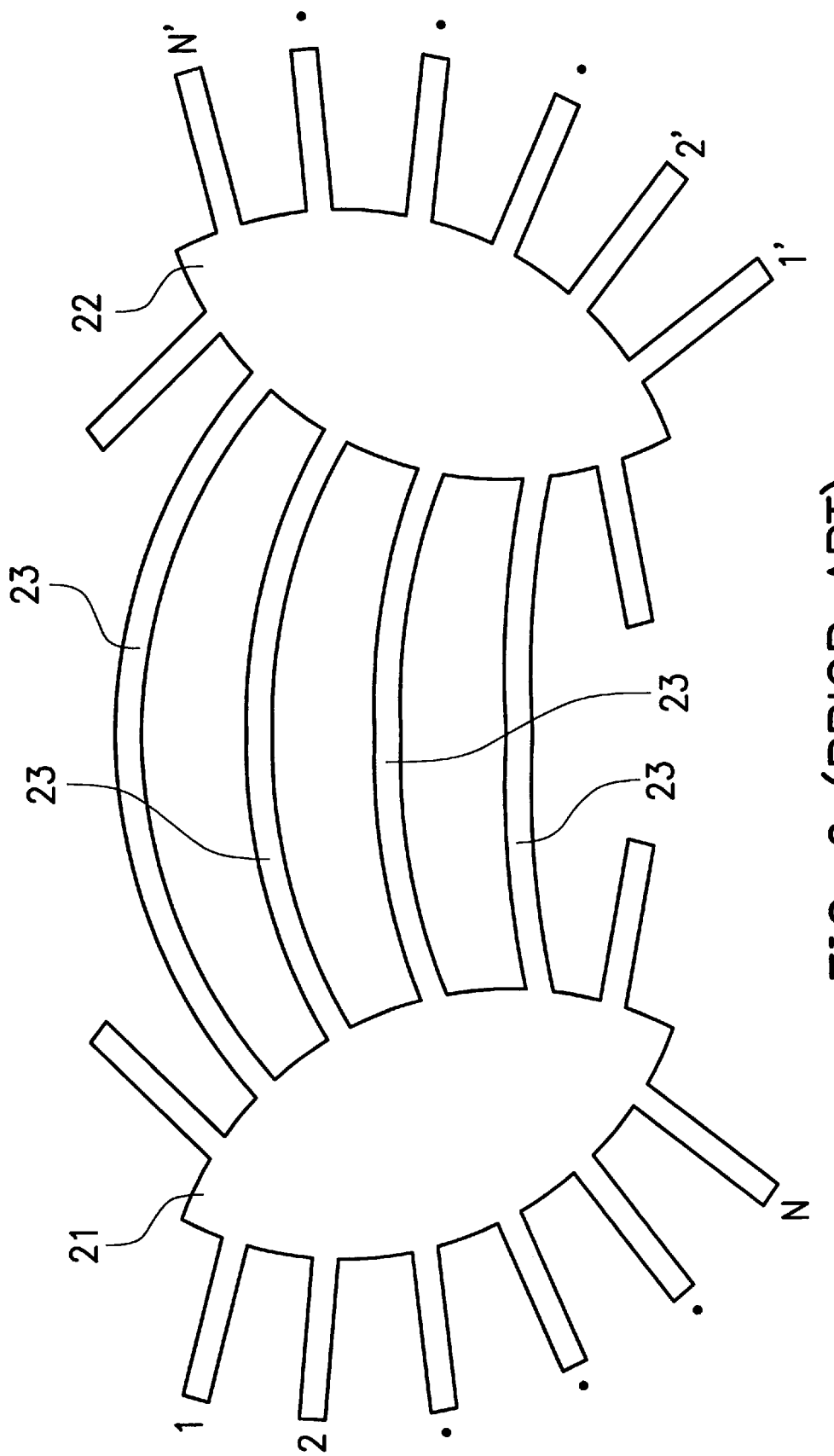
FIG. 2 depicts a dispersion slope compensator according to a second example of the prior art.
Figure 3:
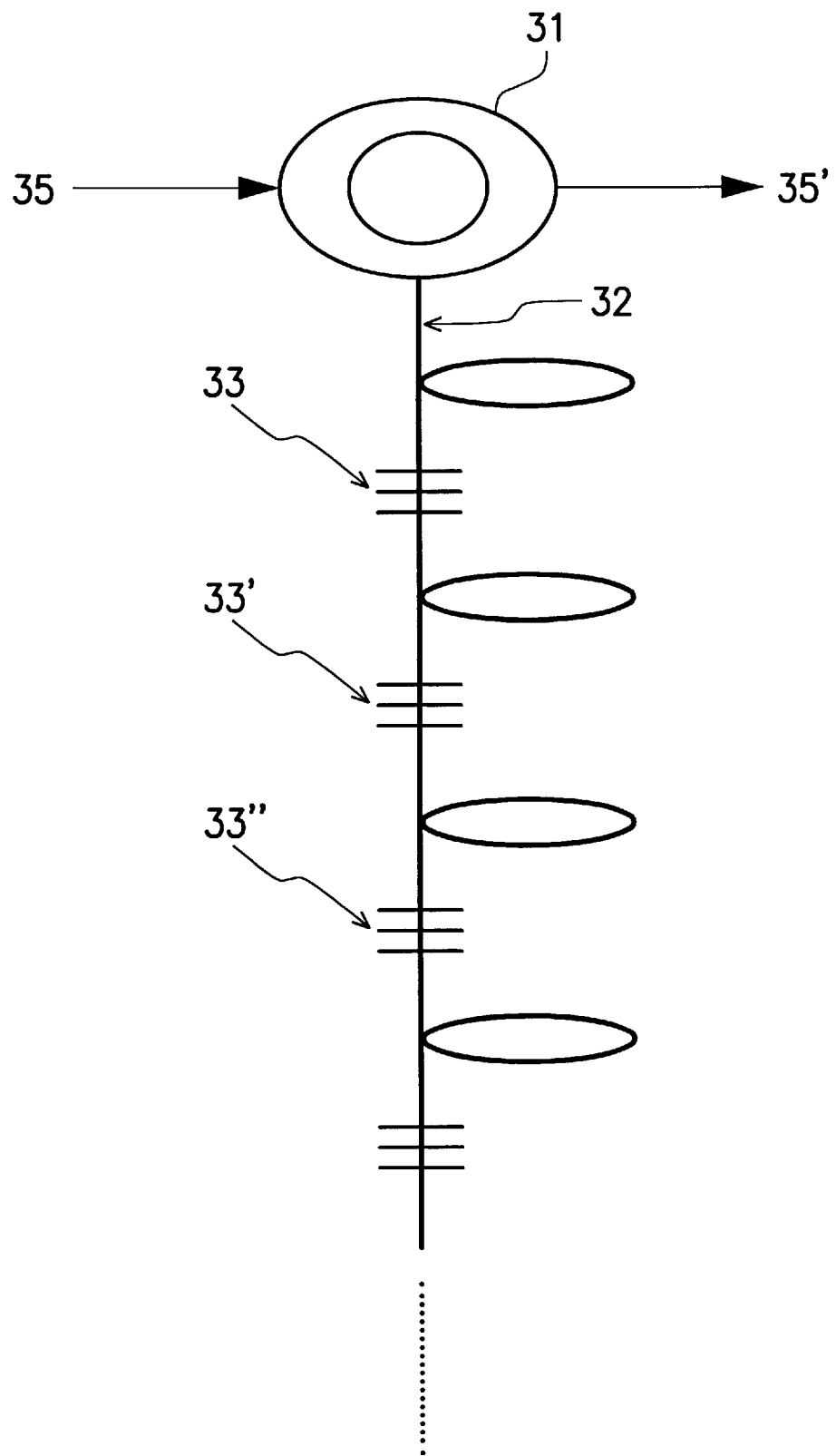
FIG. 3 depicts a dispersion slope compensator according to the present invention.

FIG. 3 depicts a dispersion slope compensator according to the present invention, which includes an optical circulator 31, a dispersion compensation fiber 32 and a plurality of fiber gratings 33, 33', 33" . . . .

Figure 4A:
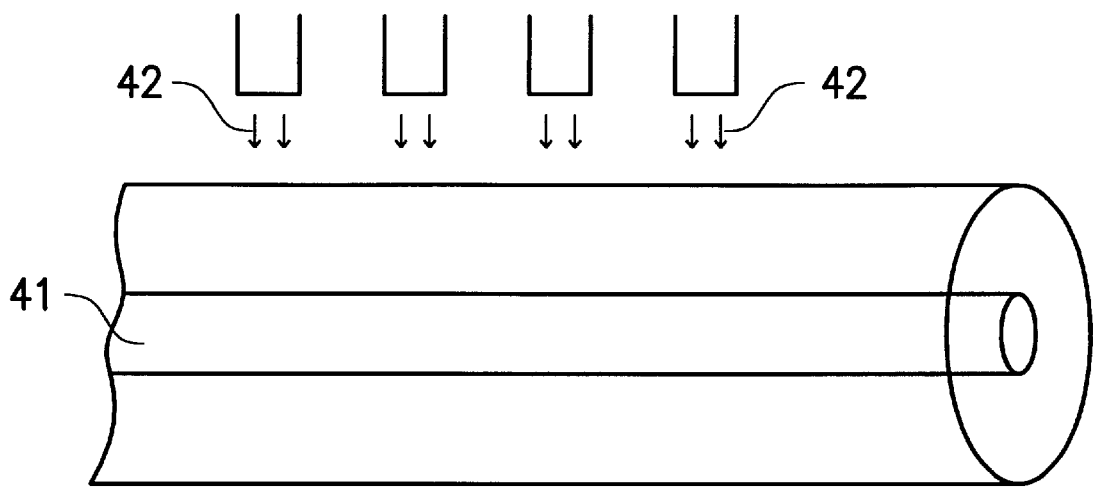
FIGS. 4A and 4B depict the method of producing fiber gratings used in the present invention.
Figure 4B:
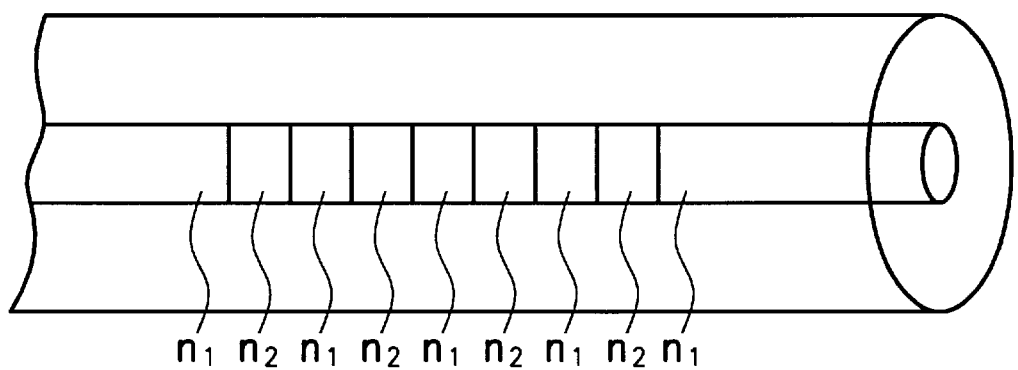

The fiber gratings 33, 33' or 33" . . . are made, as shown in FIG. 4A, by exposing a germanium doped silicon fiber 41 to ultraviolet rays 42 so that the refractive indexes of the exposed portions of the germanium doped silicon fiber 41 are changed. For example, the refractive index of the germanium doped silicon fiber 41 is originally $n_1$. After the germanium doped silicon fiber 41 is exposed to ultraviolet rays, the refractive indexes of the exposed portions of the germanium doped silicon fiber 41 are changed into $n_2$, as shown in FIG. 4B. In this way, fiber gratings can be "written" at any a position of the germanium doped silicon fiber 41. Such fiber gratings are so called "fiber Bragg gratings" (FBGs), used for selectively reflecting an optical signal of a specific wavelength from mixed optical signals propagating in an optical fiber. How the fiber gratings operate is described as follows:

When mixed optical signals of wavelengths $\lambda_1, \lambda_2 \ldots \lambda_N$ propagate in an optical fiber provided with fiber gratings, one of the optical signals (assume $\lambda_2$) fails to pass through the fiber gratings due to the change of the refractive index in the propagation path. That is, the optical signal of wavelength $\lambda_2$ is totally reflected by the fiber gratings while the other optical signals ($\lambda_1, \lambda_3, \ldots, \lambda_N$) pass through the fiber gratings. The reflectivity of fiber gratings is determined by the time period of exposing the germanium doped silicon fiber to ultraviolet rays. Furthermore, the central frequency of the reflected optical signal is determined by the pitch of the fiber gratings.

How the dispersion slope compensator of the present invention operates is now described. Referring back to FIG. 3, mixed optical signals of different wavelengths propagate from a position 35 into the dispersion compensation fiber 32 via the optical circulator 31 and are reflected by the fiber gratings 33, 33', 33" . . . to another position 35' through the optical circulator 31.

In the present invention, the fiber gratings 33, 33', 33" . . . of different central frequencies are written at predetermined positions of the dispersion compensation fiber 32 so as to respectively reflect the corresponding optical signal among the mixed optical signals back to the optical circulator 31. For instance, the optical signal of wavelength $\lambda_1$ is reflected by the fiber gratings 33 while the rest of the mixed optical signals ($\lambda_2, \lambda_3 \ldots \lambda_N$) pass through the fiber gratings 33. Then, another optical signal of wavelength $\lambda_2$ is reflected by the fiber gratings 33' while the rest of the mixed optical signals ($\lambda_3, \lambda_4 \ldots \lambda_N$) pass through the fiber gratings 33'. Thus, the accumulated dispersions of respective optical signals can be fully compensated due to the different propagating distances of each optical signals $\lambda_1, \lambda_2 \ldots \lambda_N$ in the dispersion compensation fiber 32. In design, therefore, the fiber gratings are written at proper positions of the dispersion compensation fiber 32 according to the known accumulated dispersions of respective optical signals. Then, the accumulated dispersions of respective optical signals can be compensated perfectly.

Furthermore, the energy losses of the optical signals are different due to the different propagating distances in the dispersion compensation fiber 32. The long propagating distance results in the great energy loss. Therefore, the reflectivity of each fiber gratings in the present invention is predetermined by controlling the time period for exposing the germanium doped silicon fiber to ultraviolet rays in the manufacturing process. The optical signal propagating a long distance in the dispersion compensation fiber corresponds to the fiber gratings of high reflectivity. On the other hand, the optical signal propagating a short distance in the dispersion compensation fiber corresponds to the fiber grating of low reflectivity. In this way, the energies of respective optical signals are made equal.

The advantages of the present invention at least include easy system installation, accurate dispersion compensation and equalization of output energies of respective optical signals. Furthermore, the optical circulator, the dispersion compensation fiber and the fiber gratings used in the present invention are all commercially available and inexpensive. Therefore, the present invention is of great application value.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dispersion slope compensator comprising:

a dispersion compensation fiber;

an optical circulator connected between an optical fiber and said dispersion compensation fiber for introducing mixed optical signals propagating in said optical fiber into said dispersion compensation fiber; and a plurality of fiber gratings provided at predetermined positions of said dispersion compensation fiber so as to respectively reflect said mixed optical signals back to said optical fiber through said optical circulator, wherein said predetermined positions correspond to propagation distances necessary to compensate the respective accumulated dispersions of different optical signals of said mixed optical signals.

2. The dispersion slope compensator as claimed in claim 1, wherein the reflectivity of each of said fiber gratings corresponds to the propagation distance between said optical circulator and said fiber grating, wherein the greater the propagation distance between said optical circulator and said fiber grating the higher the reflectivity of said fiber grating.

3. The dispersion slope compensator as claimed in claim 2, wherein reflectivity of each said fiber grating is predetermined such that the energy of each different optical signal of said mixed optical signals is equal when said different optical signal arrives back at said optical circulator after reflection by said fiber grating.

* * * * *